US006775614B2

(12) United States Patent
Kim

(10) Patent No.: US 6,775,614 B2
(45) Date of Patent: Aug. 10, 2004

(54) VEHICLE NAVIGATION SYSTEM USING LIVE IMAGES

(76) Inventor: Sug-bae Kim, 207-1206 Samik New Town Apt. 308-11 Naedang-dong, Seo-gu, Daegu-shi 703-060 (KR)

( * ) Notice: Subject to any disclaimer, the term of this patent is extended or adjusted under 35 U.S.C. 154(b) by 24 days.

(21) Appl. No.: 10/258,463

(22) PCT Filed: Apr. 24, 2001

(86) PCT No.: PCT/KR01/00685

§ 371 (c)(1), (2), (4) Date: Oct. 24, 2002

(87) PCT Pub. No.: WO01/82261

PCT Pub. Date: Nov. 1, 2001

(65) Prior Publication Data

US 2003/0105587 A1 Jun. 5, 2003

(51) Int. Cl.$^{7}$ .................................................. G01C 21/32

(52) U.S. Cl. ........................ 701/213; 701/208; 701/117; 348/113; 348/207.1; 358/1.15

(58) Field of Search ................................ 701/213, 214, 701/208, 211, 117, 702; 348/113, 207.1, 207.99; 340/934, 995.13, 995, 907, 933; 342/357.09, 357.13; 358/1.15; 372/92

(56) References Cited

U.S. PATENT DOCUMENTS

| | | | | | |
|---|---|---|---|---|---|
| 5,396,429 | A | * | 3/1995 | Hanchett | 340/937 |
| 5,504,683 | A | * | 4/1996 | Gurmu et al. | 340/989 |
| 5,831,552 | A | * | 11/1998 | Sogawa et al. | 340/995.27 |
| 6,032,098 | A | * | 2/2000 | Takahashi et al. | 701/210 |
| 6,124,826 | A | * | 9/2000 | Garthwaite et al. | 342/357.09 |
| 6,125,326 | A | | 9/2000 | Ohmura et al. | 701/213 |
| 6,151,550 | A | * | 11/2000 | Nakatani | 701/117 |
| 6,191,704 | B1 | * | 2/2001 | Takenaga et al. | 340/903 |
| 6,226,591 | B1 | * | 5/2001 | Okumura et al. | 701/216 |
| 6,253,153 | B1 | | 6/2001 | Kantani et al. | 701/209 |
| 6,285,317 | B1 | * | 9/2001 | Ong | 342/357.13 |
| 2003/0225516 | A1 | * | 12/2003 | DeKock et al. | 701/214 |

FOREIGN PATENT DOCUMENTS

| | | |
|---|---|---|
| JP | 10-132598 | 5/1998 |
| JP | 11-160090 | 6/1999 |
| KR | 1999-49731 | 7/1999 |
| KR | 1999-64862 | 8/1999 |

* cited by examiner

*Primary Examiner*—Thomas G. Black
*Assistant Examiner*—Tuan C To
(74) *Attorney, Agent, or Firm*—Fish & Richardson P.C.

(57) ABSTRACT

The invention relates to a vehicle navigation system using live images which not only maps driver's current position input form the GPS receiver with GIS to indicate the distance between driver's current position and his destination, shortest traveling distance and route possible, and previously driven trace, but also provides an image input from a camera set up at the selected place on a real-time basis if a place is selected to take a close look at the traffic situation, so that the driver can drive, directly checking the traffic situation of the selected place.

3 Claims, 2 Drawing Sheets

VEHICLE NAVIGATION SYSTEM USING LIVE IMAGES

BACKGROUND OF THE INVENTION

1. Field of the Invention

The present invention relates to a vehicle navigation system, and more particularly to a vehicle navigation system using live images which not only maps driver's current position input from a global positioning system (GPS) receiver with a a geographic information system (GIS) to indicate the distance between driver's current position and his destination, shortest travelling distance and route possible, and previously driven trace, but also provides an image input from a camera set up at the selected place on a real-time basis if a place is selected to take a close look at the traffic situation, so that the driver can drive, directly checking the traffic situation of the selected place.

2. Description of the Prior Art

GPS is a satellite navigation system that has been developed by US department of defense. Radio wave signals generated by atomic frequencies of three to four satellites are received to estimate a distance to those satellites by using the propagation time of radio wave signals. Finally, driver's current position is obtained by measuring velocity of the vehicle with a three (or two) dimensional phase positioning method and Doppler effect of radio wave.

As described above, the vehicle navigation system using live images of the present invention includes the aforementioned vehicle navigation system in which signals of GPS satellites are used for mapping with GIS to provide information on distance between the current position and destination of the vehicle, time to be taken to reach the destination, and so on, marking the current position and destination of a running vehicle on a map.

FIG. 1 is a block diagram for illustrating a vehicle navigation system using the conventional GPS.

As shown in FIG. 1, the conventional vehicle navigation system using GPS comprises: a GPS receiver 11 for receiving signals transmitted from GPS satellites; a main control unit 12 for estimating the current position of a vehicle with the signals input from the GPS receiver and mapping it with GIS; and a display unit 13 for marking and displaying it to a driver of the vehicle.

Also, a key input unit 14 is also included in the conventional vehicle navigation system for controlling the degree of zooming up the map displayed at the display unit 13.

However, there is a problem in the conventional vehicle navigation system in that only current position and destination of a vehicle or current position and previously driven route are marked through GPS in a map without any information on traffic or road conditions from outside, thereby presenting a considerable limitation in use.

In order to solve the aforementioned problem, a method for estimating and marking the shortest route between current position and destination of a vehicle has been accompanied with another method disclosed in patent No. 1997-9165 (Jun. 07, 1997) titled "Vehicle navigation system using global positioning system and pager networking system and information data processing method for the same", in which the pager networking system is used for displaying traffic or road condition in a map to easily reach the destination.

However, there is also a problem in the aforementioned method for providing text information on the shortest distance or the traffic or road situation by using the pager networking system in that it is difficult for the driver to accurately grasp the traffic situation with briefly summarized text information without actually viewing the traffic condition.

In addition, there is another problem in the aforementioned method in that all the information on traffic or road condition is collected from a plurality of places and then provided in total so that the driver cannot obtain current information on traffic or road condition on the real-time basis, but only information on traffic or road conditions happened in the past.

SUMMARY OF THE INVENTION

Therefore, it is an object of the present invention to solve the aforementioned problem and provide a vehicle navigation system using live images, in which driver's current position measured by GPS is used for mapping with a geographic information system to immediately indicate driver's current position, shortest traveling distance and route to destination and previously driven trace along with a live image input from a camera set up at a place about which the driver has selected to collect necessary information.

In order to accomplish the aforementioned object of the present invention, there is provided a vehicle navigation system using live images comprising:

a GPS receiver for receiving signals transmitted from GPS satellite;

a display unit for indicating driver's current position and image in the geographic information system;

a key input unit for manipulating a variety of control keys;

a plurality of cameras set up at a plurality of places for taking pictures of traffic or road condition at predetermined places;

an image input unit for receiving images captured by a plurality of cameras;

an image server for selectively outputting an image captured by a camera set up at a place corresponding to a position value of a signal input from the image input unit;

a first data transmitting and receiving unit for transmitting an image output from the image server and receiving the position value;

a second data transmitting and outputting unit for transmitting a position value and receiving an image through continuous communication with the first data transmitting unit; and a main control unit for calculating to determine the position with the signal input from the GPS receiver, outputting driver's position mapped in the geographic information system and the image input from the second data transmitting and receiving unit to a display unit, controlling the display unit according to the value input from the key input unit and outputting the position value through the second data transmitting and receiving unit.

At this time, the first and second data transmitting and receiving units can be interconnected through a wireless internetworking system.

Furthermore, the image input unit receives images output from a plurality of cameras set up at a plurality of places through a wireless or cable networking system.

The vehicle navigation system of the present invention thus constructed maps driver's current position input from the GPS receiver with GIS and marks it in the display unit. If the driver selects a place to view the traffic situation with the key input unit, the system also transmits a position value of the selected place to the image server which receives the image input from a camera set up at the place relevant to the position value and outputs it to the display unit. As a result, the driver can travel, directly check the traffic situation of a selected place on a real-time basis.

BRIEF DESCRIPTION OF THE DRAWINGS

Objects and aspects of the invention will become apparent from the following description of a preferred embodiment with reference to the accompanying drawings in which.

DETAILED DESCRIPTION OF THE PRESENT INVENTION

Objects and aspects of the present invention will become apparent from the following detailed description of a preferred embodiment with reference to the accompanying drawings. However, the embodiment of the present invention will not limit the scope of the invention, but simply presents a preferred embodiment.

Figure 1:
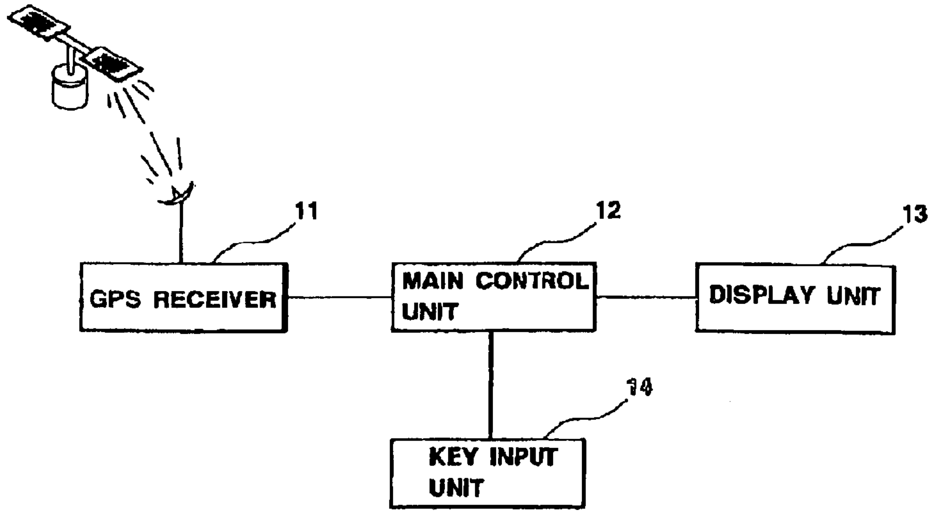
FIG. 1 is a block diagram for illustrating a vehicle navigation system using a conventional GPS.
Figure 2:
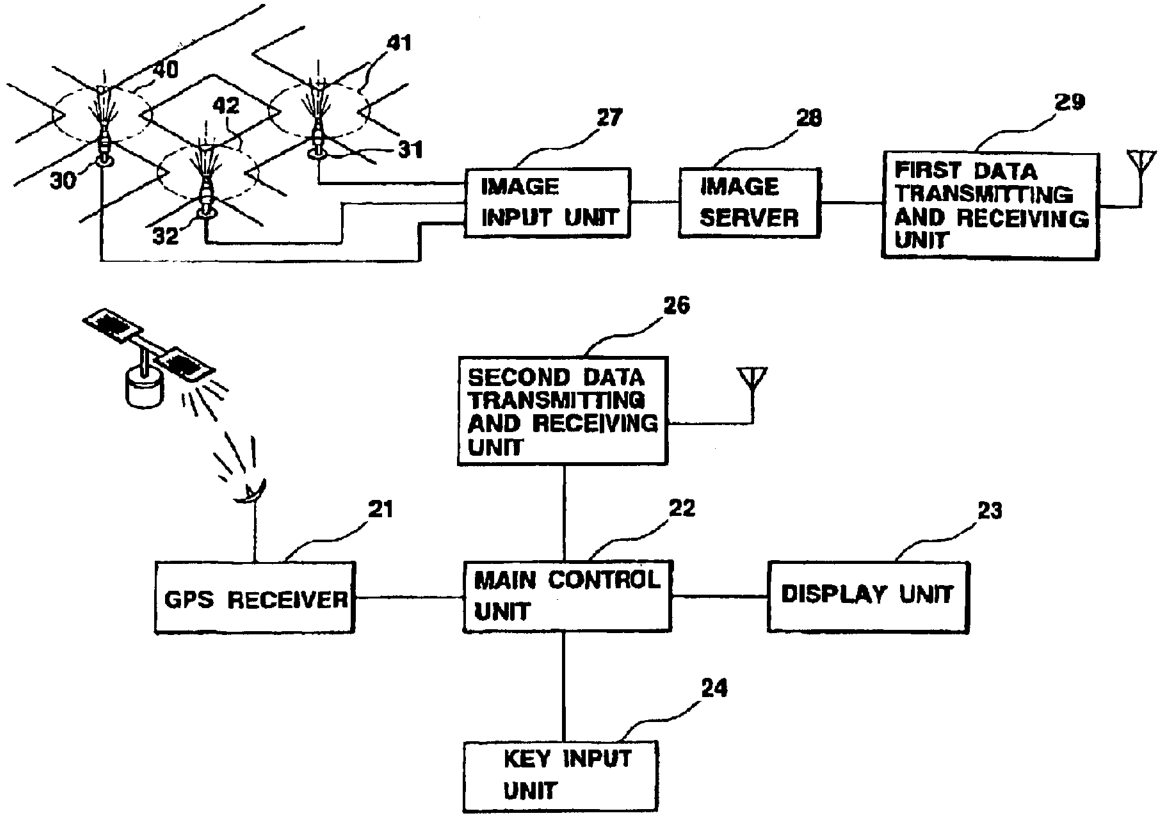
FIG. 2 is a block diagram for illustrating a vehicle navigation system using live images in accordance with the present invention.

FIG. 2 is a block diagram for illustrating a vehicle navigation system using live images in accordance with the present invention.

As shown in FIG. 2, the vehicle navigation system using live images comprises: a GPS receiver 21 for receiving signals transmitted from a GPS satellite; a display unit 23 for indicating driver's current position and image in the geographic information system; a key input unit 24 for manipulating a variety of control keys; a first camera 30 set up at a first intersection 40; a second camera 31 set up at a second intersection 41; a third camera 32 set up at a third intersection 42; an image input unit 27 for receiving images captured by the cameras 30, 31, 32; an image server 28 for selectively outputting an image captured by a camera set up at a place corresponding to a position value of a signal input from the image input unit 27; a first data transmitting and receiving unit 29 for transmitting an image output from the image server 28 and receiving the position value; a second data transmitting and outputting unit 26 for transmitting a position value and receiving an image through continuous communication with the first data transmitting unit 29; and a main control unit 22 for calculating to determine the position with the signal input from the GPS receiver 21, outputting driver's position mapped in the geographic information system and the image input from the second data transmitting and receiving unit 26 to a display unit 23, controlling the display unit 23 according to the value input from the key input unit 24 and outputting the position value through the second data transmitting and receiving unit 26.

At this time, the first and second data transmitting and receiving units 29, 26 can be interconnected through a wireless internetworking system.

Furthermore, the image input unit 27 can receive images output from the first through third cameras 30, 31, 32 set up at the first through third intersections 40, 41, 42 through a wireless or cable networking system.

Figure 3:
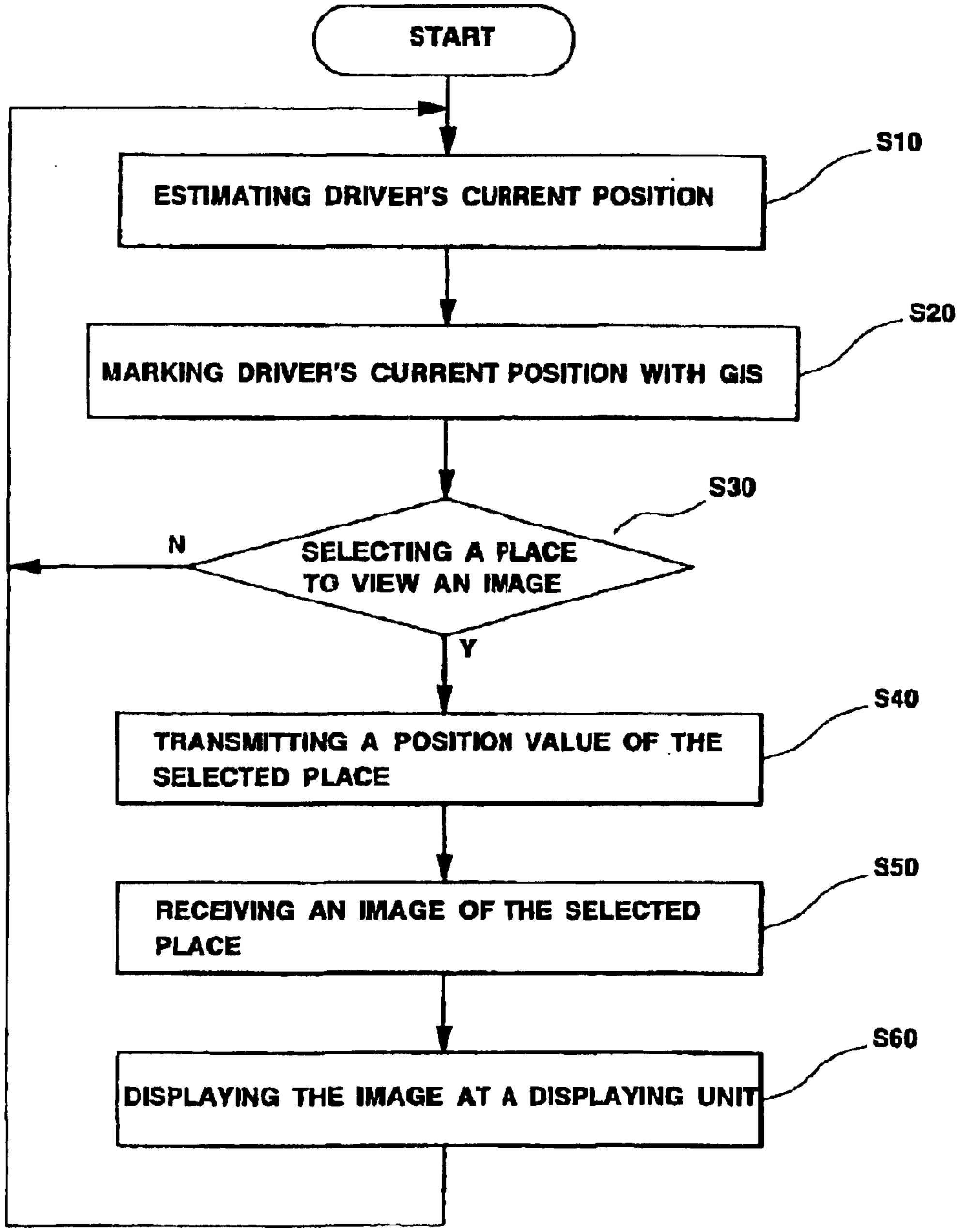
FIG. 3 is a flow chart for illustrating sequential processes of a vehicle navigation system using live images in accordance with the present invention.

Operations of the vehicle navigation system using live images thus constructed will be described with reference to FIG. 3, a flow chart for illustrating sequential processes of a vehicle navigation system using live images.

First of all, the main control unit 22 calculates driver's current position by receiving a frequency transmitted from GPS satellite through the GPS receiver 21 (S10). Then, a calculated position value of driver's is mapped with the GIS to mark driver's current position at the display unit 23 (S20).

Next, the main control unit 22 discriminates whether the driver has selected to view an image of a predetermined place (S30).

At this time, if the driver does not select to view an image of a predetermined place, only his current position is calculated with movement of a vehicle, mapped with the GIS and marked at the display unit 3, in the same method as that of the conventional vehicle navigation system.

However, if the driver selects to view an image of a road at a predetermined place, or if he wants to directly check the traffic situation of the first intersection 40, a position value related to the first intersection 40 is transmitted through the second data transmitting and receiving unit 26 (S40). Then, the image server 28 receives the position value through the first data transmitting and receiving unit 29 and the image captured by the fist camera 30 set up at the first intersection 40 and input from the image input unit 27 and transmits them through the first data transmitting and receiving unit 29. Finally, the second data transmitting and receiving unit 26 receives an image signal (S50), and the display unit 23 installed in the vehicle shows information with a live image for the driver (S60).

In addition, if the driver inputs a position value of the second intersection 41 to view the traffic situation, an image captured by the second camera 31 is input and transmitted to let the driver view the live image of traffic situation of the second intersection 41 at the display unit 23 installed in the vehicle.

Therefore, the driver can drive, directly checking the traffic situation of his desired destination with live images on a real-time basis.

As described above, there is an advantage in the vehicle navigation system of the present invention in that the system maps driver's current position input from the GPS receiver with GIS to indicate the distance between driver's current position and his destination, shortest travelling distance and route possible, and previously driven trace, and, if a place is selected to take a close look at the traffic situation, it also provides an image input from a camera set up at the selected place on a real-time basis so that the driver can drive, directly checking the traffic situation of the selected place.

What is claimed is:

1. A vehicle navigation system using live images comprising:

a GPS receiver for receiving signals transmitted from GPS satellite;

a display unit for indicating driver's current position and image in the geographic information system;

a key input unit for manipulating a variety of control keys;

a plurality of cameras set up at a plurality of places for taking pictures of traffic or road condition at predetermined places;

an image input unit for receiving images captured by a plurality of cameras;

an image server for selectively outputting an image captured by a camera set up at a place corresponding to a position value of a signal input from the image input unit;

a first data transmitting and receiving unit for transmitting an image output from the image server and receiving the position value;

a second data transmitting and outputting unit for transmitting a position value and receiving an image through continuous communication with the first data transmitting unit; and a main control unit for calculating to determine the position with the signal input from the GPS receiver, outputting driver's position mapped in the geographic information system and the image input from the second data transmitting and receiving unit to a display unit, controlling the display unit according to the value input from the key input unit and outputting the position value through the second data transmitting and receiving unit.

2. The system, as defined in claim 1, wherein the first and second data transmitting and receiving units can be interconnected through a wireless internetworking system.

3. The system, as defined in claim 1, wherein the image input unit receives images output from a plurality of cameras set up at a plurality of places through a wireless or cable networking system.

* * * * *

UNITED STATES PATENT AND TRADEMARK OFFICE

CERTIFICATE OF CORRECTION

PATENT NO. : 6,775,614 B2
DATED : August 10, 2004
INVENTOR(S) : Sug-Bae Kim

It is certified that error appears in the above-identified patent and that said Letters Patent is hereby corrected as shown below:

<u>Title page,</u>
Item [56], References Cited, FOREIGN APPLICATION DATA, add the following:
-- Republic of Korea 2000/21664, filed April 24, 2000 --

Signed and Sealed this

Twenty-ninth Day of March, 2005

JON W. DUDAS
*Director of the United States Patent and Trademark Office*